United States Patent [19]

Blaney et al.

[11] Patent Number: 5,074,958
[45] Date of Patent: * Dec. 24, 1991

[54] METHOD FOR REMOVING POLYCHLORINATED DIBENZODIOXINS AND POLYCHLORINATED DIBENZOFURANS AND STICKIES FROM SECONDARY FIBERS USING SUPERCRITICAL PROPANE SOLVENT EXTRACTION

[75] Inventors: Carol A. Blaney, Roswell, Ga.; Shafi U. Hossain, Menasha, Wis.

[73] Assignee: Kimberly-Clark Corporation, Neenah, Wis.

[*] Notice: The portion of the term of this patent subsequent to Apr. 23, 2008 has been disclaimed.

[21] Appl. No.: 686,071

[22] Filed: Apr. 15, 1991

Related U.S. Application Data

[63] Continuation-in-part of Ser. No. 596,807, Oct. 12, 1990, Pat. No. 5,009,745, and a continuation-in-part of Ser. No. 596,819, Oct. 12, 1990, Pat. No. 5,009,746.

[51] Int. Cl.$^5$ .......................... D21C 5/02; D21C 9/08
[52] U.S. Cl. .......................................... 162/5; 162/63; 162/199; 162/DIG. 4; 423/DIG. 20
[58] Field of Search .......... 162/4, 5, 199, 63, DIG. 4; 423/DIG. 20

[56] References Cited

U.S. PATENT DOCUMENTS

| | | |
|---|---|---|
| 1,805,751 | 5/1931 | Auerbach . |
| 2,281,865 | 5/1942 | Van Dijck . |
| 2,284,583 | 5/1942 | Lewis . |
| 2,391,576 | 12/1945 | Katz et al. . |
| 3,969,196 | 7/1976 | Zosel .................................. 203/49 |
| 4,061,566 | 12/1977 | Modell . |
| 4,113,446 | 9/1978 | Modell et al. . |
| 4,147,624 | 4/1979 | Modell . |
| 4,263,253 | 4/1981 | Pilz et al. . |
| 4,308,200 | 12/1981 | Fremont . |
| 4,331,695 | 5/1982 | Zosel .................................. 426/430 |
| 4,338,199 | 7/1982 | Modell . |
| 4,354,928 | 10/1982 | Audeh et al. ....................... 208/309 |
| 4,422,966 | 12/1983 | Amer ................................. 260/97.6 |
| 4,434,028 | 2/1984 | Eppig et al. ....................... 196/14.52 |
| 4,466,923 | 8/1984 | Friedrich . |
| 4,472,442 | 9/1984 | Katz . |
| 4,493,797 | 1/1985 | Avedesian . |
| 4,495,095 | 1/1985 | Lawson et al. . |
| 4,543,190 | 9/1985 | Modell . |
| 4,550,198 | 10/1985 | Myerson . |
| 4,554,170 | 11/1985 | Panzner et al. . |
| 4,564,458 | 1/1986 | Burleson . |
| 4,594,164 | 6/1986 | Titmas . |
| 4,647,466 | 3/1987 | Japikse et al. . |
| 4,675,198 | 6/1987 | Sevenants . |
| 4,703,060 | 10/1987 | Traitler et al. . |
| 4,728,525 | 3/1988 | Toro et al. . |
| 4,767,634 | 8/1988 | Kaleda et al. . |

FOREIGN PATENT DOCUMENTS

| | | |
|---|---|---|
| 314223 | 5/1989 | European Pat. Off. . |
| WO81/00854 | 4/1981 | PCT Int'l Appl. . |
| WO81/00855 | 4/1981 | PCT Int'l Appl. . |

OTHER PUBLICATIONS

*Supercritical Fluid Extraction;* McHugh/Krukonis—'-'Early Industrial Applications"—pp. 105–112, 1986.
*Supercritical Fluid Extraction;* McHugh/Krukonis—"-Fractionation of Chlorotrifluoroethylene", p. 158, 1986.
Botre et al., *Environmental Science and Technol.,* vol. 12, No. 3, Mar. 1978, pp. 335–336.
Brady et al., "Supercritical Extraction of Toxic Organics from Soils", *Ind. Eng. Chem. Res.,* 1987, vol. 26, pp. 261–268.

(List continued on next page.)

[57] ABSTRACT

A process for removing stickies and/or PCDD's and PCDF's from cellulose-containing fibers such as waste paper is provided. The process comprises contacting the fibers with supercritical or near supercritical propane for a period of time sufficient to extract a substantial portion of the stickies and/or PCDD's and PCDF's without substantially damaging the fibers. Extraction efficiencies of up to 95% for PCDD's or PCDF's and of about 70% to 95% for stickies have been achieved with the technique.

25 Claims, 2 Drawing Sheets

OTHER PUBLICATIONS

Crosby et al., *Environmental Health Perspectives*, Sep. 1973, pp. 259–266.

Crosby et al., *Science*, vol. 173, Aug. 20, 1971, pp. 173–174.

Dooley et al., *EPA Report No. 600/9-87/018F*, pp. 383–397.

Dulin et al., *Environ. Sci. Technol.*, vol. 20, No. 1, 1986, pp. 72–77.

Eckert et al., *Environ. Sci. Technol.*, 1986, vol. 20, pp. 319–325.

Groves et al., *CRC Critical Reviews in Environmental Control*, 1985, vol. 15, pp. 237–274.

Hatakeda et al., *Nipon Kagaku Kaishi*, 1987, No. 5, pp. 931–933.

Hawthorne et al., *J. Chromatogr.*, 1987, vol. 403, pp. 63–76.

Hawthorne et al., *Anal. Chem.*, 1987, vol. 59, pp. 1705–1708.

Li et al., *Ind. Eng. Chem. Res.*, 1988, vol. 27, pp. 1301–1312.

Modell, M., *Fundam. Thermochem. Biomass Convers.*, 1985, pp. 95–119.

Ottoboni, A., *The Dose Makes the Poison*, Vincente Books, Berkeley, Calif., 1984.

Pang et al., *Ind. Eng. Chem. Process. Des. Dev.*, 1985, vol. 24, pp. 1027–1032.

Plimmer, J. R., *Bull. Environm. Contam. Toxicol.*, vol. 20, 1978, pp. 87–92.

Podoll et al., *Environ. Sci. Technol.*, vol. 20, No. 5, 1986, pp. 490–492.

Rappe et al., *Chlorinated Dioxins and Dibenzofurans in the Total Environment II*, Keith et al. eds., Butterworth, 1985, pp. 125–126.

Ritter and Campbell, *Biotechnology and Bioengineering Symp.*, 1986, No. 17, pp. 179–182.

Schneiderman et al., *J. Chromatogr.*, 1987, vol. 409, pp. 343–353.

Shishikura et al., *J. Jpn. Oil Chem. Soc.*, 1988, vol. 37, pp. 8–12.

Srinivasan et al., *Chlorinated Dioxins and Dibenzofurans in Perspective*, Rappe et al. eds., Lewis Publishers, Inc., 1986, pp. 531–537.

West et al., *Can. J. Chem. Eng.*, 1987, vol. 65, pp. 645–650.

*Chemosphere—Chlorinated Dioxins and Related Compounds 1987*, McNelis et al., eds., Pergamon Press, New York, vol. 18, Nos. 1–6, 1989, p. 50.

*Dioxins*, NTIS Report No. PB82-136847, Industrial Environmental Research Laboratory, Cincinnati, Ohio, Nov. 1980, Section 6.

Suprex Publication No. TN-022, Suprex Corporation, Pittsburgh, PA., 1989.

*Primary Examiner*—Karen M. Hastings
*Attorney, Agent, or Firm*—William D. Herrick

METHOD FOR REMOVING POLYCHLORINATED DIBENZODIOXINS AND POLYCHLORINATED DIBENZOFURANS AND STICKIES FROM SECONDARY FIBERS USING SUPERCRITICAL PROPANE SOLVENT EXTRACTION

This application is a continuation-in-part of U.S. application Ser. No. 07/596,807 filed 12 Oct. 1990, now U.S. Pat. No. 5,009,745 and of U.S. application Ser. No. 07/596,819 filed 12 Oct. 1990, now U.S. Pat. No. 5,009,746.

BACKGROUND OF THE INVENTION

The present invention relates to the use of supercritical or near supercritical carbon dioxide or propane to remove polychlorinated dibenzo-p-dioxins, (referred to hereinafter as "PCDD's" or simply "dioxins"), and polychlorinated dibenzofurans, (referred to hereinafter as "PCDF's") and to remove sticky contaminants (hereinafter referred to as "stickies") from secondary fibers.

As known in the art, secondary fibers comprise materials, usually cellulose-based, which have been used at least once in their intended primary use area but are, nevertheless, amenable to further processing and subsequent reuse. Waste paper, newsprint, ledger stock, packaging materials, cartons, boxes, computer printouts, telephone directories, corrugated boards, and the like represent suitable raw stock for conversion to secondary fibers. The pattern of reuse (i.e., use of the secondary fiber) may not always be similar to the use to which the primary (virgin) fiber was put.

Efficient management of solid wastes, of which cellulose-based materials constitute a significant part (e.g., waste paper, 40%; yard waste, 18%), has become an important societal theme. In recent years, efforts to recycle waste paper have intensified with the ever increasing concerns as to the rate of use of raw materials and the possible adverse environmental impact of common industrial processes. Novel screening systems and sophisticated flotation techniques have emerged which in large measure have successfully addressed the problem of deinking printed stock. New bleaching sequences which avoid the use of chlorine or chlorine compounds and rely solely upon hydrogen peroxide, dithionites, or formamidine sulfinic acid for attaining acceptable levels of brightness are also making their appearance.

One aspect of waste paper reuse, however, has remained a continuing concern. This area is the presence of small quantities of toxic compounds, in particular, PCDD's and PCDF's, in waste papers.

Bleached kraft fibers under a variety of guises (e.g., coated paper, ledger paper, etc.) are often present in substantial quantities in waste paper stock as purchased from commercial dealers. Kraft pulps, when bleached with sequences including an elemental chlorine stage, can contain small but detectable levels of PCDD's and PCDF's. The processing steps currently used to treat waste paper (e.g., pulping/screening/flotation/bleaching) are not effective in removing such compounds from stock containing chlorine-bleached fibers.

PCDD's and PCDF's are large groups of chloroorganic compounds which have become ubiquitous in industrial societies. The structures of these compounds are as follows, where in each case $x+y=1-8$:

Of the various possible isomers of these compounds, the following are reportedly the most toxic:
2,3,7,8-tetrachlorodibenzo-p-dioxin (TCDD)
1,2,3,7,8-pentachlorodibenzo-p-dioxin (PCDD)
2,3,7,8-tetrachlorodibenzofuran (TCDF)
1,2,3,7,8-pentachlorodibenzofuran (PCDF)
2,3,4,7,8-pentachlorodibenzofuran (pCDF).

Also reported to be highly toxic are:
1,2,3,6,7,8-hexachlorodibenzo-p-dioxin (HCDD)
1,2,3,7,8,9-hexachlorodibenzo-p-dioxin (HCDD)
1,2,3,4,7,8-hexachlorodibenzo-p-dioxin (HCDD)
1,2,3,6,7,8-hexachlorodibenzofuran (HCDF)
1,2,3,7,8,9-hexachlorodibenzofuran (HCDF)
1,2,3,4,7,8-hexachlorodibenzofuran (HCDF)
2,3,4,6,7,8-hexachlorodibenzofuran (HCDF)
See Rappe et al., "Analysis of Polychlorinated Dibenzofurans and Dioxins in Ecological Samples", in *Chlorinated Dioxins and Dibenzofurans in the Total Environment II*, Keith, L. H., Rappe, C. and Choudhary, G., eds., Butterworh Publishers, Boston, Mass., 1985, pages 125–126.

In the recent past, the issue of health hazards associated with PCDD's and PCDF's has received much attention in the news media. PCDD's and PCDF's are known to cause a temporary form of a skin ailment known as "chlor-acne." Also, PCDD's and PCDF's (particularly 2,3,7,8-TCDD) have been proven to be extremely toxic to certain animals in laboratory studies, in particular to guinea pigs (LD50=0.6–4.0 micrograms/kilogram). See, for example, Ottoboni, A., *The Dose Makes the Poison,* Vincente Books, Berkeley, Calif., 1984, and *Dioxins,* NTIS Report No. PB82-136847, Industrial Environmental Research Laboratory, Cincinnati, Ohio, November, 1980, Section 6.

Because of this reported high level of toxicity to a common laboratory test animal (i.e., the guinea pig), there is a general concern as to the long-term effects of PCDD's and PCDF's on human physiology. Accordingly, there is an important need to remove or substantially reduce the content of PCDD's and PCDF's from waste paper stock as part of the recycling process. It is an object of the present invention to respond to this need.

Another aspect of waste paper reuse has remained a continuing problem both with regard to machine operability and with regard to product quality. This area is the presence of sticky contaminants in the stock used to prepare the secondary fibers.

Stickies consist primarily of organic polymers used in the paper converting industry, such as, hot melts, pressure-sensitive adhesives, styrofoam, and latices. Typical stickies include: polyvinyl acetate (PVA) polymers and copolymers, ethylene vinyl acetate (EVA) polymers and copolymers, polystyrene, styrene-butadiene, polypropylene, polyethylene, polyamide, latex and other rubber compounds, wax, and the like. A particularly common source of stickies is the tackifiers which are added to paper products to improve adhesion properties.

When waste papers containing these adhesives/tackifiers are defibered, stickies are broken down into particles having a wide range of sizes, e.g., less than 0.074 millimeter to greater than 0.42 millimeter. Inefficient removal of stickies causes off-quality paper (e.g., poor appearance, lower strength, and/or holes) and paper machine downtime (e.g., web breaks, slippery sheets, and/or deposition of stickies on such machine components as wires, felts, presses, rolls, and/or drying cylinders).

In an effort to deal with these problems various chemical and mechanical means have been considered. For example, talc and zirconium oxide have been used as pacification agents for stickies. High temperatures, high pressures, and/or solvent addition have been employed as dispersion techniques. Reverse hydroclones and throughflow cleaners have been used to try to screen and/or clean stickies from the feed stock.

Also, efforts have been made to select the stock used for recycling ("furnish selection"). In general, furnish selection is not cost effective. Also, as fiber recycling becomes more important in the context of environmental concerns, the furnish itself will tend to become less "virgin" and more of secondary and tertiary origin, which will, in turn, seriously aggravate the stickies problem.

Notwithstanding these wide ranging efforts, the removal of stickies remains an unsolved problem in the area of fiber recycling. As recognized in the art, irrespective of the technique used, some stickies end up in the paper machine headbox where they adversely affect machine runability and product quality. Accordingly, there is an important and continuing need to remove or substantially reduce the content of stickies in waste paper stock which is going to be recycled. It is an object of the present invention to respond to this need.

Supercritical fluids, including supercritical carbon dioxide and propane, have been proposed for use in various industrial and pollution control processes. A review of this work can be found in Eckert et al., "Supercritical fluid processing", *Environ. Sci. Technol.*, 1986, vol. 20, pp. 319-325. Among other things, these authors describe general applications of supercritical fluid technology to materials processing and pollution control. In particular, they discuss a study in which supercritical ethylene was used to remove trichlorophenol from soil as a model for the removal of dioxins and polychlorinated biphenyls (PCBs). No data are presented for dioxins. More particularly, the reference does not disclose or suggest removing dioxins from recycled paper using supercritical carbon dioxide or propane.

Pang et al., "Supercritical Extraction of Aromatic Hydrocarbon Solids and Tar and Bitumens", *Ind. Eng. Chem. Process. Des. Dev.*, 1985, vol. 24, pp. 1027-1032 discuss the use of various supercritical fluids, including carbon dioxide, to extract organic materials from tar sands. The reference mentions the possibility of using supercritical extraction to remove hazardous materials such as PCBs and dioxin from soils. Again, no data are presented for dioxin and no suggestion is made that supercritical carbon dioxide can be used to remove dioxins from secondary fibers. Also, the data presented for tar sands shows that carbon dioxide extraction produced the poorest yield.

Other studies involving the use of supercritical fluids including carbon dioxide to remove hazardous organic materials from environmental solids such as soil can be found in Groves et al. "State-of-the-art on the supercritical extraction of organics from hazardous wastes", *CRC Critical Reviews in Environmental Control*, 1985, vol. 15, pp. 237-274; Hawthorne et al., "Extraction and Recovery of Polycyclic Aromatic Hydrocarbons from Environmental Solids Using Supercritical Fluids", *Anal. Chem.*, 1987, vol. 59, pp. 1705-1708; Dooley et al., "Supercritical Fluid Extraction and Catalytic Oxidation of Toxic Organics from Soils", *EPA Report No. 600/9-87/018F*, pp. 383-397; and Brady et al. "Supercritical Extraction of Toxic Organics from Soils", *Ind. Eng. Chem. Res.*, 1987, vol. 26, pp. 261-268. None of these studies discloses or suggests the use of supercritical carbon dioxide or propane to remove PCDD's and PCDF's from secondary fibers.

Along these same lines, U.S. Pat. Nos. 4,338,199 and 4,543,190 to Modell describe a process in which organic materials are oxidized in supercritical water. The '199 patent includes a general statement that its process can be used to remove toxic chemicals from the wastes generated by a variety of industries including forest product wastes and paper and pulp mill wastes. No specific mention is made of dioxins. The '190 patent describes the treatment of various chlorinated organics other than dioxins with supercritical water and states that conversion of these materials to chlorinated dibenzo-p-dioxins was not observed (see Example 6). The use of supercritical water to treat organic waste materials is also disclosed in PCT Patent Publication No. WO 81/00854, Modell et al., U.S. Pat. No. 4,113,446, Burleson, U.S. Pat. No. 4,564,458, and Titmas, U.S. Pat. No. 4,594,164.

A summary of experiments performed by Modar, Inc., using the Modell supercritical water process was published in *Chemosphere—Chlorinated Dioxins and Related Compounds* 1987, McNelis et al., editors, Pergamon Press, New York, 1989, Vol. 18, Nos. 1-6, page 50. As described therein, bench-scale tests were performed on soils and liquid wastes contaminated with chlorobenzenes and PCDD's. Supercritical water oxidation was found to remove 2,3,7,8-TCDD and chlorobenzenes from soil and to remove 2,3,7,8-TCDD, TCDD's and OCDD from liquid wastes.

Various uses of supercritical fluids in the processing of materials have been disclosed in the literature. For example, supercritical carbon dioxide has been used to remove tall oil and turpentine from coniferous woods in Fremont, U.S. Pat. No. 4,308,200, to extract lignin from the black liquor produced by the Kraft process for pulp production in Avedesian, U.S. Pat. No. 4,493,797, to treat refinery sludges in European Patent Publication No. 314,223, to regenerate absorbents used in waste water treatment systems in Modell, U.S. Pat. Nos. 4,061,566 and 4,147,624, to sterilize pharmaceuticals in Pilz et al., U.S. Pat. No. 4,263,253, to remove off-flavor materials from textured vegetable products in Sevenants, U.S. Pat. No. 4,675,198, to remove gamma-linolenic acid from fruit seeds in Traitler et al., U.S. Pat. No. 4,703,060, and to decaffeinate coffee in Katz, U.S. Pat. No. 4,472,442; Toro et al., U.S. Pat. No. 4,728,525 and Kaleda et al., U.S. Pat. No. 4,767,634. See also, Friedrich, U.S. Pat. No. 4,466,923; Lawson et al., U.S. Pat. No. 4,495,095; Myerson, U.S. Pat. No. 4,550,198; Panzner et al., U.S. Pat. No. 4,554,170; Japikse et al., U.S. Pat. No. 4,647,466; Ritter and Campbell, "The Effects of Supercritical Carbon Dioxide Extraction on Pine Wood Structure", *Biotechnology and Bioengineering Symp.*, 1986, no. 17, pp. 179-182; Hatakeda et al., "Extraction of Sugi (*Cryptomeria japonica* D. Don) with supercritical carbon dioxide", *Nipon Kagaku Kaishi*, 1987, no. 5, pp. 931-933; Shishikura et al., "Concentration of Tocopherols from Soybean Sludge by Supercritical Fluid Extraction", *J. Jpn. Oil Chem. Soc.*, 1988, vol. 37, pp. 8-12; and Li and Kiran "Interaction of Supercritical Fluids with Lignocellulosic Materials", *Ind. Eng. Chem. Res.*, 1988, Vol. 27, pp. 1301-1312.

Supercritical water or near supercritical water has been used to treat wood chips and black liquor from pulping in Modell, PCT Patent Publication No. WO 81/00855. See also Modell, M., "Gasification and Liquefaction of Forest Products in Supercritical Water", *Fundam. Thermochem. Biomass Convers.*, 1985, pp. 95-119; and West et al., "Pyrolysis of 1,3-butanediol as a model reaction for wood liquefaction in supercritical water", *Can. J. Chem. Eng.*, 1987, vol. 65, pp. 645-650.

In addition to their use in waste treatment and materials processing, supercritical fluids have been used in connection with various analytic procedures. For example, Suprex Publication No. TN-022, Suprex Corporation, Pittsburgh, Pa., 1989, mentions the use of supercritical carbon dioxide as part of an analytical procedure for assaying dioxins, but no mention is made of using supercritical carbon dioxide for the reduction of dioxins in cellulosic substrates. Similarly, Hawthorne et al., "Directly Coupled Supercritical Fluid Extraction-Gas Chromatographic Analysis of Polycyclic Aromatic Hydrocarbons and Polychlorinated Biphenyls from Environmental Solids", *J. Chromatogr.*, 1987, vol. 403, pp. 63-76, discuss the use of supercritical fluid extraction coupled to a gas chromatograph to analyze environmental solids, e.g., urban dust, for organic pollutants, specifically, polycyclic aromatic hydrocarbons. The extraction was performed using nitrous oxide as the supercritical fluid. Along similar lines, Schneiderman et al., "Determination of Anthraquinone in Paper and Wood Using Supercritical Fluid Extraction and High-Performance Liquid Chromatography with Electrochemical Detection", *J. Chromatogr.*, 1987, vol. 409, pp. 343-353, describe the combination of supercritical fluid extraction using carbon dioxide, high-performance liquid chromatography, and electrochemical detection to analyze Kraft paper and pine plywood sawdust for anthraquinone.

Significantly, none of these references in any way discloses or suggests that the problems of removing PCDD's and PCDF's or removing stickies from secondary fibers can be solved by treating the fibers with supercritical carbon dioxide or supercritical propane.

Some references exist in the literature regarding attempts to decompose or destroy dioxins in a state of solution in liquid media (e.g., hexane) or in substances such as silica gel or clay via photolytic techniques, e.g., UV radiation. See Ottoboni, supra; Crosby, D. G., et al., *Science*, Vol. 173, Aug. 20, 1971, pages 173-174; Plimmer, J. R., *Bull. Environm. Contam. Toxicol.*, Vol. 20, 1978, pages 87-92; Botre, Claudio, Adriana Memoil, and Franco Alhaique, *Environmental Science and Technol.*, Vol. 12, No. 3, March 1978, pages 335-336; Crosby, D. G., et. al., *Environmental Health Perspectives*, Sept. 1973, pages 259-266; Dulin, David, Howard Drossman, and Theodore Mill, *Environ. Sci. Technol.*, Vol. 20, No. 1, 1986, pages 72-77; and Podoll, R. Thomas, Helen M. Jaber, and Theodore Mill, *Environ. Sci. Technol.*, Vol. 20, No. 5, 1986, pages 490-492. The process has been shown to work to an extent but appears to be highly dependent upon the presence of a hydrogen donor solvent, the type and level of impurities present, and the substrate. Furthermore, the photoproduct resulting from irradiation of 2,3,7,8-TCDD has been reported to be trichloro- and dichloro-benzo-p-dioxins, which are less toxic than 2,3,7,8-TCDD but, nevertheless, are undesirable.

As with the art relating to supercritical fluid technology, these references do not address the secondary fiber problem and, in particular, do not suggest that this problem can be solved by extracting PCDD's and PCDF's or by removing stickies from such fibers using supercritical carbon dioxide or supercritical propane.

In considering the particular problem of removing PCDD's and PCDF's from secondary fibers, it is important to note various characteristics of secondary fibers and of PCDD's and PCDF's which make the removal process particularly difficult. For example, secondary fibers have a relatively high surface area per gram. As known in the art, high surface area materials are capable of strongly binding organic compounds, such as PCDD's and PCDF's. See Srinivasan et al., "Binding of OCDD, 2,3,7,8-TCDD and HCB to Clay-Based Sorbents," in *Chlorinated Dioxins and Dibenzofurans in Perspective*, Rappe, C., Choudhary, G., and Keith, L. H., eds., Lewis Publishers, Inc., Chelsea, Mich., 1986, page 532.

Moreover, in an air or water system, PCDD's and PCDF's will adhere to solid sorbents rather than remaining free in solution. Thus, partition coefficients in the range of $2.8-67.1 \times 10^3$ have been reported for 2,3,7,8-TCDD for a variety of sorbents including hydroxy aluminum-clay and activated carbon. This compound also adheres quite well to glass in a water environment. See Srinivasan et al., supra at pages 531-537.

The combined effects of large surface areas and large partition coefficients make the effective removal of PCDD's and PCDF's from secondary fibers difficult to achieve. It is to this challenge that one embodiment of the present invention is directed. Alternatively, in a second embodiment, the invention is directed to the removal of stickies from secondary fibers.

SUMMARY OF THE INVENTION

In view of the foregoing state of the art, it is an object of the present invention to provide a method for removing PCDD's and PCDF's from secondary fibers. More particularly, it is an object of the invention to provide a method for reducing the level of PCDD's and PCDF's in secondary fibers by more than about 70% and preferably by more than about 90%. It is a specific object of the invention to remove one or more of the following PCDD and PCDF isomers from secondary fibers:

2,3,7,8-tetrachlorodibenzo-p-dioxin
1,2,3,7,8-pentachlorodibenzo-p-dioxin
2,3,7,8-tetrachlorodibenzofuran
1,2,3,7,8-pentachlorodibenzofuran
2,3,4,7,8-pentachlorodibenzofuran
1,2,3,6,7,8-hexachlorodibenzo-p-dioxin
1,2,3,7,8,9-hexachlorodibenzo-p-dioxin
1,2,3,4,7,8-hexachlorodibenzo-p-dioxin
1,2,3,6,7,8-hexachlorodibenzofuran 1,2,3,7,8,9-hexachlorodibenzofuran
1,2,3,4,7,8-hexachlorodibenzofuran
2,3,4,6,7,8-hexachlorodibenzofuran.

It is a further object of the invention to provide a method for removing PCDD's and PCDF's from secondary fibers which is cost-effective, simple to perform, and which will not deleteriously affect the desirable and marketable attributes of the fibers after treatment.

Moreover, it is an additional object of the present invention to provide a method for removing stickies from secondary fibers. In particular, it is an object of the invention to provide a method for removing stickies from such fibers which is cost-effective, simple to perform, and which will not deleteriously affect the desirable and marketable attributes of the fibers after treatment.

To achieve the foregoing and other objects, the invention provides a method for removing PCDD's and PCDF's from secondary fibers which comprises contacting the secondary fibers with supercritical or near supercritical carbon dioxide or propane for a period of time at a temperature, pressure, and carbon dioxide or propane flow rate such that 1) a substantial reduction in the level of PCDD's and PCDF's associated with the fibers is achieved, and 2) the properties of the fibers, e.g., their physical and chemical properties, are not substantially degraded. An alternative embodiment to the invention provides a method for removing stickies from secondary fibers which comprises contacting the secondary fibers with supercritical or near supercritical carbon dioxide or propane for a period of time at a temperature, pressure and carbon dioxide or propane flow rate such that 1) a substantial reduction in the level of stickies associated with the fibers is achieved, and 2) the properties of the fibers, e.g., their physical and chemical properties, are not substantially degraded. Of course if both PCDDs/PCDFs and stickies are present in the secondary fibers, both will be removed by the supercritical fluid extraction of the present invention.

In general terms, high levels of PCDD and PCDF extraction and/or stickies removal in combination with low levels of fiber degradation are achieved for pressures above about 60 atmospheres for carbon dioxide and above about 30 atmospheres for propane, preferably from about 73 atmospheres to about 300 atmospheres for carbon dioxide and from about 42 atmospheres to about 300 atmospheres for propane, and most preferably from about 80 atmospheres to about 200 atmospheres for carbon dioxide and about 40 atmospheres to about 200 atmospheres for propane, temperatures above about 25° C. for carbon dioxide and above about 80° C. for propane, preferably from about 31° C. to about 150° C. for carbon dioxide and from about 97° C. to about 200° C. for propane, and most preferably from about 31° C. to about 90° C. for carbon dioxide and from about 97° C. to about 150° C. for propane, carbon dioxide or propane flow rates in the range from about 0.01 standard liters/minute/gram of dry secondary fiber (slpm/gm) to about 10 slpm/gm, preferably from about 0.1 slpm/gm to about 1.0 slpm/gm, and processing periods of from about 1 minute to about 3 hours, preferably from about 3 minutes to about 1 hour, for the foregoing flow rates. In terms of solvent-to-feed ratios, the preferred range is from about 10 to about 200 grams of carbon dioxide or propane per gram of dry secondary fiber. These ranges, of course, may vary depending upon the particular equipment used to perform purification and the particular characteristics of the secondary fibers being treated. The specific parameters for any particular application can be readily determined by persons skilled in the art from the disclosure herein.

As demonstrated by the experimental data presented below, using processing conditions within the foregoing ranges, greater than 95% extraction was achieved for 2,3,7,8-TCDD, reportedly the most toxic of all of the PCDD's and PCDF's. In view of the strong adherence of this and related PCDD's and PCDF's to secondary fibers, the extraction levels achieved with supercritical carbon dioxide or propane are considered to be unexpectedly high.

In the alternative embodiment, as demonstrated by the experimental data presented below, using processing conditions within the foregoing ranges, on the order of one-fourth to 95% of the stickies in a typical sample of secondary fibers were removed. In view of the difficulties involved in removing stickies from waste papers, this is considered to be a particularly effective extraction level.

The accompanying drawings, which are incorporated in and constitute part of the specification, illustrate a preferred embodiment of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to the extraction of PCDD's and PCDF's from secondary fibers and, alternatively, to the removal of stickies from such fibers.

The invention can be applied to secondary fibers from a variety of sources including waste paper, newsprint, ledger stock, packaging materials, cartons, boxes, computer printouts, telephone directories, corrugated boards, and the like. In general, the major constituent of the fibers will be cellulose. The fibers can include other organic materials. Also, clays and other filler materials used in the paper manufacturing process can be present. Typically, the material being treated for PCDD or PCDF removal will include at least some fiber which was originally processed using a chlorine bleaching step and thus includes at least some PCDD's and PCDF's.

The extraction process of the invention is preferably applied to the secondary fibers prior to other steps in the reclamation (recycling) procedure, although, if desired, the process can be applied after such steps as de-inking and whitening of the secondary fibers have been performed. As used herein, the term "secondary fibers" is intended to include fibers at any stage of the reclamation process, i.e., from the raw waste material stage to the ready-for-the-second-use stage.

The extraction is performed using supercritical or near supercritical carbon dioxide or propane. The three commonly encountered states or phases of matter are solid, liquid, and gas. Depending upon the ambient conditions (e.g., pressure/temperature), the three phases can exist singly or in equilibrium with other phases.

Figure 1:
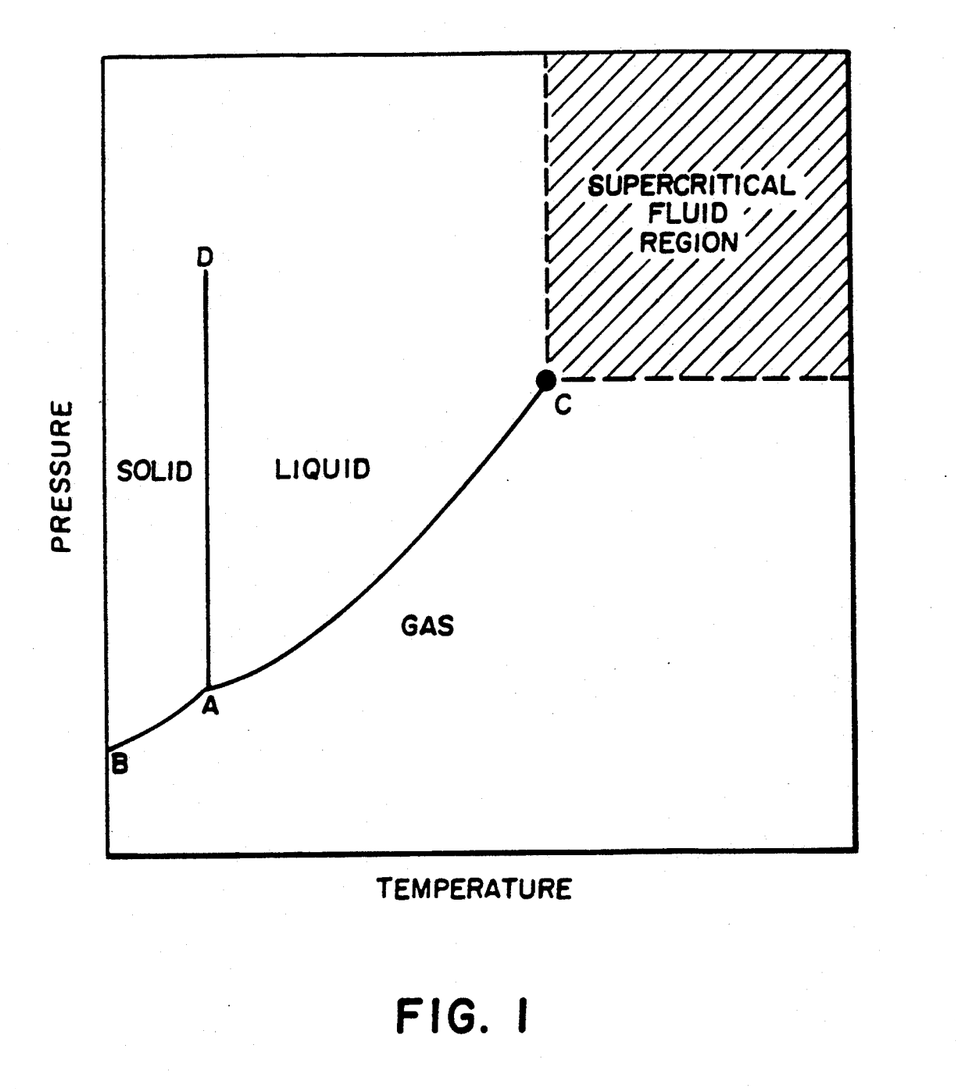
FIG. 1 is a pressure-temperature diagram illustrating carbon dioxide's or propane's supercritical fluid region.

The phase diagram of FIG. 1 illustrates the relationship between these phases for a pure substance, i.e., for pure carbon dioxide or propane. The curves AB, AC, and AD represent the boundaries separating single phases. These curves are known as "coexistence curves" since the phases exist in equilibrium along these curves. Specifically, curve AB is the solid/gas equilibrium curve, curve AC is the liquid/gas equilibrium curve, and curve AD is the solid/liquid equilibrium curve. For simplicity, the curves are often termed the sublimation, vapor pressure, and melting curves.

Point A of FIG. 1 is known as the triple point where all three phases coexist in equilibrium. Point C, the end point of the vapor pressure curve, is known as the gas-liquid critical point where the distinction between gas and liquid disappears. The temperature and the pressure at the critical point are known as the critical temperature (Tc) and the critical pressure (Pc). No gas can be liquefied above its Tc, no matter how great the pressure. The shaded region in FIG. 1 is known as the supercritical fluid state, and a substance existing in that region (i.e., a substance which has been heated above its Tc and compressed beyond its Pc) is termed a supercritical fluid (SCF).

In the supercritical state, substances behave partly as a gas and partly as a liquid. Their densities can be liquid-like but their diffusivities and viscosities resemble gases. The density of a supercritical fluid may be continuously changed without phase separation by changes in pressure and/or temperature. Density-dependent properties such as solvent power also undergo corresponding changes. For example, when water approaches the supercritical state (Tc=374° C. and Pc=218 atm), it tends to lose its hydrogen-bonding characteristics, its dielectric constant tends to suffer a dramatic decline, and it tends to become miscible with certain hydrocarbons such as benzene.

As discussed above, the present invention uses supercritical or near supercritical carbon dioxide or propane to remove PCDD's and PCDF's from secondary fibers. The critical temperature and pressure for pure carbon dioxide are 31° C. and 72.9 atmospheres, respectively and for pure propane are 98.7° C. and 41.9 atmospheres, respectively. Of course, as used in the present invention, carbon dioxide or propane is not operating in a simple, pure state, but as part of a multi-component system. It is possible, therefore, that, depending upon the particular system, the advantages of the invention can be achieved even though the pressures and/or the temperatures used are not above the critical values for pure carbon dioxide or propane, as the case may be. It is in this sense that the phrase "near supercritical" is used herein.

Figure 2:
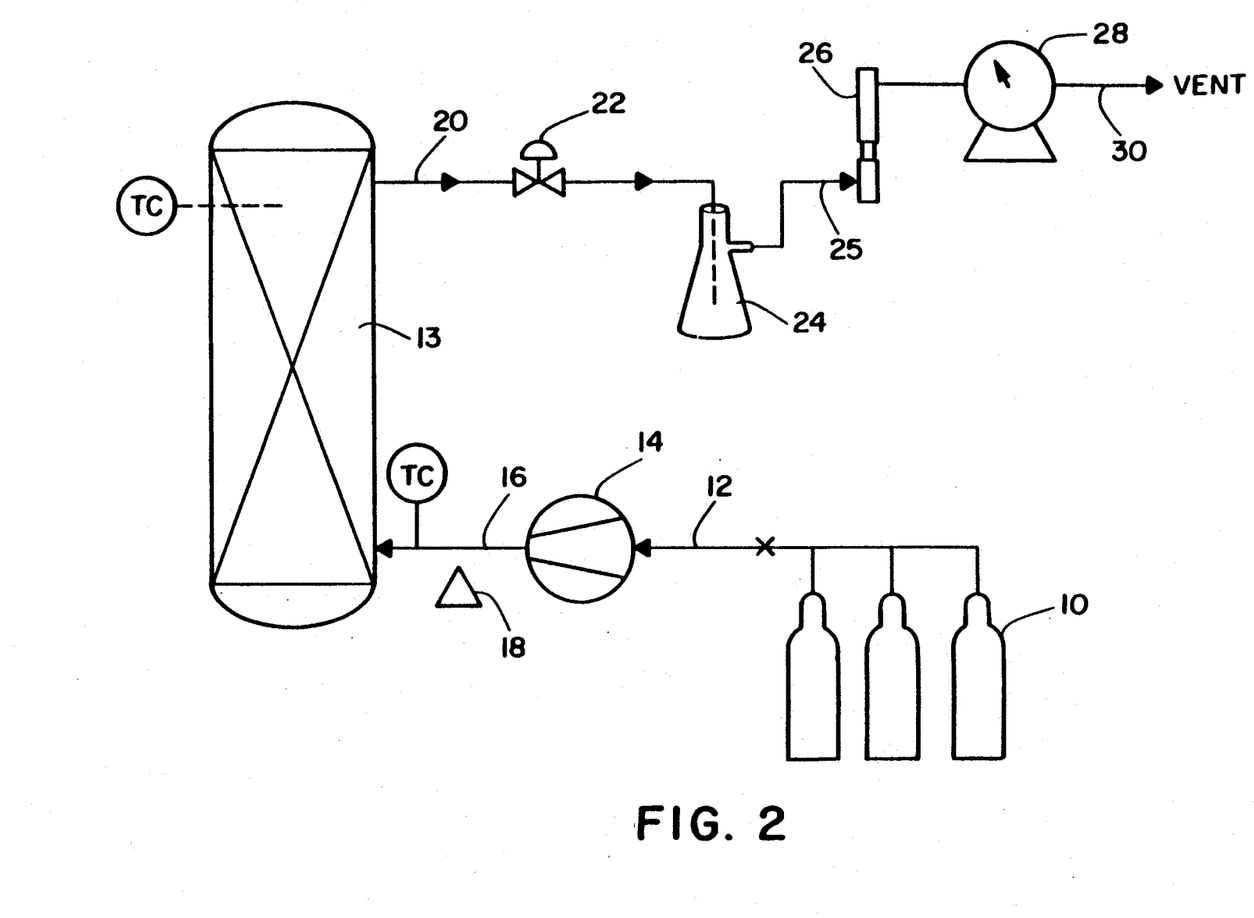
FIG. 2 illustrates representative equipment which can be used in the practice of the invention.

FIG. 2 shows representative apparatus for practicing the invention in a batch mode. It should be noted that apparatus other than that shown in FIG. 2 can be used to practice the invention. In particular, the literature references and patent publications discussed above disclose various equipment configurations which can be used in extraction processes employing supercritical fluids. The use of such equipment with the present invention will be evident to persons of ordinary skill in the art from the disclosure herein. It should also be noted that the invention can be practiced in a flow-through mode, rather than a batch.

In the system of FIG. 2, carbon dioxide or propane from supply 10 is fed through conduit 12 to compressor 14 which raises the pressure of the carbon dioxide or propane above its critical pressure. The compressed carbon dioxide or propane is then passed through conduit 16 where it is heated above its critical temperature by heating tape 18.

The supercritical carbon dioxide or propane then enters extraction vessel 13 which has been previously loaded with the secondary fibers which are to be extracted. Vessel 13 will normally include heating means (not shown) to maintain the temperature of the carbon dioxide or propane above its critical temperature. Vessel 13 will also be constructed to operate at pressures above the critical pressure of the carbon dioxide or propane.

As the supercritical carbon dioxide or propane passes through vessel 13 it extracts PCDD's and PCDF's and/or stickies from the secondary fibers. The supercritical carbon dioxide or propane with its load of chloro-organics and/or stickies leaves vessel 13 by means of conduit 20 and passes through pressure reduction valve 22 which reduces the pressure of the carbon dioxide or propane. As a result, the PCDD's and PCDF's and/or stickies precipitate out of the carbon dioxide or propane and are collected in collector 24. If desired, the stickies and/or PCDD's and PCDF's in the carbon dioxide or propane stream can be captured on a solid support by passing the stream through, for example, a bed of activated carbon, clay, or the like. The stickies and/or PCDD's and PCDF's can subsequently be removed from the bed by, for example, heating the bed to a temperature sufficient to fully decompose the stickies and/or PCDD's and PCDF's.

After the stickies and/or the PCDD's and PCDF's have been removed, the carbon dioxide or propane stream leaves collector 24 through conduit 25 and passes through flow meter 26 and dry test meter 28. Dry test meter 28 is used to measure accumulative gas flow. Flow meter 26 is used to measure the flow rate of carbon dioxide or propane through the system. As discussed above, the preferred flow rate is in the range of from about 0.01 to about 10 slpm/gm of dry secondary fiber. Based on the readings obtained from flow meter 26, pressure reduction valve 22 (or alternatively a separate flow controlling valve) is adjusted to achieved the desired flow rate.

As shown in FIG. 2, after passing through dry test meter 28, the carbon dioxide or propane is vented to the atmosphere. Alternatively, the carbon dioxide or propane can be collected and recycled through compressor 14.

Without intending to limit it in any manner, the present invention will be further illustrated by the following examples.

EXAMPLE 1

In overview, the experimental method used to demonstrate the ability of supercritical carbon dioxide to remove PCDD's and PCDF's from secondary fibers involved "spiking" a shredded waste paper sample with radioactively labeled 2,3,7,8-TCDD followed by extraction of the sample with supercritical carbon dioxide. The levels of labeled TCDD before and after extraction constituted the measure of removal efficiency.

The waste paper used was a blend of white and colored ledger grades and coated sulfate. Both softwood and hardwood fibers were represented. The paper sample was shredded and then put through a Wiley mill for further comminution.

One hundred grams of the comminuted sample were suspended in 300 ml of hexane and the loosened particles, largely consisting of extraneous non-cellulosic matter (e.g., dirt particles), were skimmed off. The paper sample was then dried in a rotary evaporator. The sample was then added to 300 ml of hexane which contained 30 nanograms (ng) of radio-labelled TCDD ($^{13}C_{12}$ 2,3,7,8-TCDD). The mixture was stirred to ensure homogeneity. The "spiked" sample was then dried in a rotary evaporator. The entire procedure was repeated with a second 100 gm paper sample and the two samples were mixed.

The extraction was carried out using the apparatus shown in FIG. 2. Extraction vessel 13 had a capacity of 3.0 liters, was made of stainless steel and was electrically heated. The system was fitted with suitable instrumentation for measurement of temperature and pressure throughout the process.

A sample, approximately 77 gm in weight, of the spiked and dried secondary fibers was placed in the extraction vessel, sandwiched between layers of dioxin-free glass wool. Carbon dioxide was passed through the system at the rate of approximately 14.5 standard liters per minute (slpm) so as to give a flow rate per gram of approximately 0.2 slpm/gm. The pressure was maintained between 4800 and 5200 psia and the temperature between 67° C. and 75° C. As indicated above, Tc and Pc for $CO_2$ are 31° C. and 1072 psia, respectively. The extraction was carried out for a period of five hours. The overall solvent-to-feed ratio was 105 grams $CO_2$ per gram of fiber.

Samples of the extracted material and the spiked material prior to extraction (the "control") were analyzed for $^{13}C_{12}$ 2,3,7,8-TCDD. The analysis was carried out using gas chromatography and high-resolution mass spectrometry. Five replicate analyses were performed.

The results of this experiment are shown in Table 1. As shown therein, supercritical carbon dioxide was very effective in removing TCDD from the "spiked" sample. In particular, the method of the invention achieved an extraction efficiency of approximately 97%. As discussed above, this high level of extraction is considered surprising in view of TCDD's high partition coefficient for solid organic materials and the high surface area of secondary fibers.

TABLE 1

Calculation of Extraction Efficiencies of SC—$CO_2$ in Removing 2,3,7,8-TCDD from Secondary Fibers

| | Sample | $^{13}C_{12}$(labeled) 2,3,7,8-TCDD (ppb) |
|---|---|---|
| before extraction | a | .24 |
| | b | .24 |
| | c | .23 |
| | d | .23 |
| | e | .22 |
| | mean = | .232 |
| | standard deviation = | .008 |
| after extraction | a | .01 |
| | b | .01 |
| | c | .01 |
| | d | ND |
| | e | .01 |
| | mean = | .008 |
| | standard deviation = | .004 |

Extraction Efficiency = $\left[\frac{.232 - .008}{.232}\right] \times 100\% = 97\%$

EXAMPLE 2

The experimental method of Example 1 was also used to demonstrate the ability of supercritical propane to remove PCDD's and PCDF's from secondary fibers involved "spiking" a shredded waste paper sample with radioactively labelled 2,3,7,8-TCDD followed by extraction of the sample with supercritical propane. The levels of TCDD before and after extraction constituted the measure of removal efficiency.

The waste paper used was a blend of white and colored ledger grades and coated sulfate. Both softwood and hardwood fibers were represented. The paper sample was shredded and then put through a Wiley mill for further comminution.

One hundred grams of the comminuted sample were suspended in 300 ml of hexane and the loosened particles, largely consisting of extraneous non-cellulosic matter (e.g., dirt particles), were skimmed off. The paper sample was then dried in a rotary evaporator. The sample was then added to 300 ml of hexane which contained 30 nanograms (ng) of radio-labelled TCDD ($^{13}C_{12}$ 2,3,7,8-TCDD). The mixture was stirred to ensure homogeneity. The "spiked" sample was then dried in a rotary evaporator. The entire procedure was repeated with a second 100 gm paper sample and the two samples were mixed.

The extraction was carried out using the apparatus shown in FIG. 2. Extraction vessel 13 had a capacity of 3.0 liters, was made of stainless steel and was electrically heated. The system was fitted with suitable instrumentation for measurement of temperature and pressure throughout the process.

A sample, approximately 22 gm in weight, of the spiked and dried secondary fibers was placed in the extraction vessel, sandwiched between layers of dioxin-free glass wool. Propane was passed through the system at the rate of approximately 6.0 standard liters per minute (slpm) so as to give a flow rate per gram of approximately 0.27 slpm/gm. The pressure was maintained between 4800 and 5300 psia and the temperature between 120° C. and 130° C. As indicated above, $T_c$ and $P_c$ for propane are 96.7 and 41.9 psia, respectively. The extraction was carried out for a period of one hour. The overall solvent-to-feed ratio was 30 grams propane per gram of fiber.

Samples of the extracted material, and the spiked material prior to extraction (the "control") were analyzed for $^{13}C_{12}$ 2,3,7,8-TCDD as well as 2,3,7,8,-TCDF. The analysis was carried out using gas chromatography and high-resolution mass spectrometry. Two replicate analyses were performed.

The results of this experiment are shown in Table 2. As shown therein, supercritical propane was very effective in removing TCDD and TCDF from the "spiked" sample. In particular, the method of the invention achieved an extraction efficiency of TCDD of approximately 95%. As discussed above, this high level of extraction is considered surprising in view of PCDD's high partition coefficient for solid organic materials and the high surface area of secondary fibers.

TABLE 2

Calculation of Extraction Efficiencies of Supercritical Propane in Removing TCDD and TCDF from Secondary Fibers

| | Sample | $^{13}C_{12}$(labeled) 2,3,7,8 TCDD (ppt) | 2,3,7,8 TCDF |
|---|---|---|---|
| before extraction | a | 281 | 20 |
| | b | 244 | 19 |
| | mean = | 262 | 20 |
| after extraction | a | .17 | 4.2 |
| | b | 7.4 | 2.7 |

TABLE 2-continued

Calculation of Extraction Efficiencies of Supercritical
Propane in Removing TCDD and TCDF from Secondary Fibers

| Sample | $^{13}C_{12}$(labeled) 2,3,7,8 TCDD (ppt) | 2,3,7,8 TCDF |
|---|---|---|
| mean = | 12 | 3.5 |

2,3,7,8 TCDD Extraction Efficiency = $\frac{262 - 12}{262} \times 100\% = 95\%$ 2,3,7,8 TCDF Extraction Efficiency = $\frac{20 - 3.5}{20} \times 100\% = 83\%$

EXAMPLE 3

In overview, the experimental method used to demonstrate the ability of supercritical carbon dioxide to remove stickies from secondary fibers involved measuring the levels of ethanol/benzene, acetone, and methylene chloride extractables in waste paper samples before and after supercritical fluid extraction (SCFE).

The waste paper used was obtained from Kimberly-Clark Corporation (Neenah, Wis.) and was representative of typical stickies-containing secondary fibers. It contained approximately half softwood and half hardwood. The samples were shredded prior to extraction.

The extraction was carried out using the apparatus shown in FIG. 2. Extraction vessel 13 had a capacity of 3.0 liters, was made of stainless steel and was electrically heated. The system was fitted with suitable instrumentation for measurement of temperature and pressure throughout the process.

A sample, approximately 429 grams in weight, of the shredded waste paper was placed in the extraction vessel, sandwiched between layers of glass wool. A total extraction period of six hours was used. During the first three hours, carbon dioxide was passed through the system at a rate of approximately 16 standard liters per minute measured at 21° C. and 1.0 atmosphere so as to give a flow rate per gram of approximately 0.04 slpm/gm. During the second three hours, the carbon dioxide flow rate was increased to approximately 29 slpm corresponding to a flow rate per gram of approximately 0.07 slpm/gm. The overall solvent-to-feed ratio was thus approximately 34 grams $CO_2$ per gram of sample. Throughout the process, the pressure was maintained between 4700 and 5000 psia and the temperature between 66° C. and 74° C. As indicated above, $T_c$ and $P_c$ for $CO_2$ are 31° C. and 1072 psia, respectively.

Samples of supercritical fluid extracted material (SCFE and the material prior to supercritical extraction (the "control") were separately Soxhlet extracted with various liquid solvents to determine the percentages of the liquid solvent extractables which were removed by the supercritical extraction process. Spectra of the extracts (solvent-cast films) were then obtained via Fourier transformed infra red (FTIR) analysis to identify the extractables. Two replicate analyses were performed on each sample.

The results of this experiment are shown in Table 3. As shown therein, supercritical carbon dioxide removed approximately one-fourth to one-third of the ethanol-benzene extractables, the acetone extractables, and the methylene chloride extractables.

The extractables were determined via FTIR to be mostly styrene-butadiene rubbers and polyvinyl acetate, i.e., they were determined to be typical stickies. Accordingly, these results show that supercritical carbon dioxide extraction can produce substantial reductions in the level of sticky contaminants in secondary fibers.

TABLE 3

RESULTS FROM SC—$CO_2$ EXTRACTION OF STICKIES FROM SECONDARY FIBERS - WEIGHT PERCENT EXTRACTIVES. DRY BASIS[1]

| | Liquid Solvent Used in Soxhlet Extraction | | |
|---|---|---|---|
| | Ethanol Benzene | Acetone | Methylene Chloride |
| "Control" (Secondary Fibers before SCFE) | 0.61 | 0.53 | 0.44 |
| "SCFE" (Secondary Fibers after SCFE) | 0.44 | 0.37 | 0.34 |
| % Extractables Removed by SCFE Process | 28% | 30% | 23% |

[1] FTIR spectra show that residues contained predominantly styrene-butadiene rubber and polyvinyl acetate.

EXAMPLES 4 AND 5

The experimental method of Example 3 was also used to demonstrate the ability of supercritical propane to remove stickies from secondary fibers and involved measuring the levels of ethanol/benzene, acetone, methylene chloride, and hexane extractables in waste paper samples before and after supercritical fluid extraction (SCFE).

The waste paper used was obtained from Kimberly-Clark Corporation (Neenah, Wis.) and was representative of typical stickies-containing secondary fibers. The samples were shredded prior to extraction.

Two experiments were performed at two different propane pressures. The extractions were carried out using the apparatus shown in FIG. 2. Extraction vessel 13 had a capacity of 3.0 liters, was made of stainless steel and was electrically heated. The system was fitted with suitable instrumentation for measurement of temperature and pressure throughout the process.

In the first experiment, a sample, approximately 40 grams in weight, of the shredded waste paper was placed in the extraction vessel, sandwiched between layers of glass wool. A total extraction period of 1.25 hours was used. Propane was passed through the system at the rate of approximately 9 standard liters per minute (measured at 21° C. and 1.0 atmosphere) so as to give a flow rate per gram of approximately 0.225 slpm/gm. The overall solvent-to-feed ratio was thus approximately 30 grams propane per gram of sample. Throughout the process, the pressure was maintained between 4800 and 5200 psia and the temperature between 120° C. and 130° C. As indicated above, $T_c$ and $P_c$ for propane are 96.7° C. and 615.7 psia, respectively.

Samples of the supercritical fluid extracted material (SCFE) and the material prior to supercritical extraction (the "control") were separately Soxhlet extracted with various liquid solvents to determine the percentages of the liquid solvent extractables which were removed by the extraction process. Spectra of the extracts (solvent-cast films) were then obtained via Fourier transformed infra red (FTIR) analysis to identify the extractables. Two replicate analyses were performed on each sample.

The results of this first experiment are shown in the top part of Table 4. As shown therein, supercritical propane removed approximately 69% of the ethanol-benzene extractables, 86% of the acetone extractables, 91% of the methylene chloride extractables, and 98% of the hexane extractables.

The second experiment, Example 5, was identical, except the pressure was maintained between 1100 and 1300 psi. Results are shown in the lower part of Table 4.

The extractables were determined via FTIR to be mostly styrene-butadiene rubbers, waxes, and polyvinyl acetate, i.e., they were determined to be typical stickies. Accordingly, these results show that supercritical propane extraction can produce substantial reductions in the level of sticky contaminants in secondary fibers.

TABLE 4

RESULTS FROM PROPANE EXTRACTION OF STICKIES FROM SECONDARY FIBERS, WEIGHT PERCENT EXTRACTIVES, DRY BASIS

| | LIQUID SOLVENT USED IN SOXHLET EXTRACTION | | | |
|---|---|---|---|---|
| | Ethanol/ Benzene | Acetone | Methylene Chloride | Hexane |
| EXAMPLE 4 - PROPANE (125° C. AND 5000 PSI) | | | | |
| "Control" (Secondary Fibers before SCFE) | 1.3 | 0.86 | 1.2 | 1.0 |
| "SCFE" (Secondary Fibers after SCFE) | 0.40 | 0.12 | 0.11 | 0.02 |
| % Extractables Removed by SCFE Process | 69% | 86% | 91% | 98% |
| EXAMPLE 5 - PROPANE (125° C. AND 1200 PSI) | | | | |
| "Control" (Secondary Fibers before SCFE) | 1.2 | 1.2 | 1.0 | 0.77 |
| "SCFE" (Secondary Fibers after SCFE) | 0.71 | 0.32 | 0.30 | 0.06 |
| % Extractables Removed by SCFE Process | 42% | 74% | 70% | 93% |

What is claimed is:

1. A method for treating cellulose-containing secondary fibers with a content of:
   (a) polychlorinated dibenzo-p-dioxin and/or polychlorinated dibenzofuran, and/or
   (b) sticky contaminants,
comprising contacting the fibers with propane under pressure and temperature conditions such that the propane is a supercritical or near supercritical fluid and the content of either or both (a) or (b) is reduced.

2. The method of claim 1 wherein the fibers have a content of polychlorinated dibenzo-p-dioxin and/or polychlorinated dibenzofuran, and the treatment reduces the polychlorinated dibenzo-p-dioxin and/or polychlorinated dibenzofuran content of the secondary fibers.

3. The method of claim 2 wherein the polychlorinated dibenzo-p-dioxin and/or polychlorinated dibenzofuran content of the secondary fibers is reduced by at least about 70%.

4. The method of claim 3 wherein the polychlorinated dibenzo-p-dioxin and/or polychlorinated dibenzofuran content of the secondary fibers is reduced by at least about 90%.

5. The method of claim 1 wherein the pressure is above about 30 atmospheres and the temperature is above about 80° C.

6. The method of claim 5 wherein the pressure is above about 42 atmospheres and the temperature is above about 97° C.

7. The method of claim 6 wherein the pressure is less than about 300 atmospheres and the temperature is less than about 200° C.

8. The method of claim 7 wherein the pressure is between about 40 atmospheres and about 200 atmospheres and wherein the temperature is between about 90° C. and about 150° C.

9. The method of claim 1 wherein the supercritical or near supercritical propane is flowed through the secondary fibers and wherein the rate of flow is between about 0.01 standard liters per minute per gram of dry secondary fiber and about 10.0 standard liters per minute per gram of dry secondary fiber.

10. The method of claim 9 wherein the rate of flow is between about 0.1 standard liters per minute per gram of dry secondary fiber and about 1.0 standard liters per minute per gram of dry secondary fiber.

11. The method of claim 9 wherein the supercritical or near supercritical propane is flowed through the secondary fibers for between about one minute and about three hours.

12. The method of claim 11 wherein the supercritical or near supercritical propane is flowed through the secondary fibers for between about 3 minutes and about one hour.

13. The method of claim 1 wherein the ratio of grams of supercritical or near supercritical propane to the grams of dry secondary fiber is between about 10 and about 200.

14. The method of claim 2 wherein the polychlorinated dibenzo-p-dioxins and/or polychlorinated dibenzofurans are selected from the group consisting of 2,3,7,8-tetrachlorodibenzo-p-dioxin, 1,2,3,7,8-pentachlorodibenzo-p-dioxin, 2,3,7,8-tetrachlorodibenzofuran, 1,2,3,7,8-pentachlorodibenzofuran, 2,3,4,7,8-pentachlorodibenzofuran, 1,2,3,6,7,8-hexachlorodibenzo-p-dioxin, 1,2,3,7,8,9-hexachlorodibenzo-p-dioxin, 1,2,3,4,7,8-hexachlorodibenzo-p-dioxin, 1,2,3,6,7,8-hexachlorodibenzofuran, 1,2,3,7,8,9-hexachlorodibenzofuran, 1,2,3,4,7,8-hexachlorodibenzofuran, 2,3,4,6,7,8-hexachlorodibenzofuran, and mixtures thereof.

15. The method of claim 2 wherein the polychlorinated dibenzo-p dioxins and/or polychlorinated dibenzofurans are selected from the group consisting of 2,3,7,8-tetrachlorodibenzo-p-dioxin, 1,2,3,7,8-pentachlorodibenzo-p-dioxin, 2,3,7,8-tetrachlorodibenzofuran, 1,2,3,7,8-pentachlorodibenzofuran, 2,3,4,7,8-pentachlorodibenzofuran, and mixtures thereof.

16. The method of claim 1 wherein the fibers have a content of sticky contaminants, and the treatment reduces the level of sticky contaminants associated with the fibers.

17. The method of claim 16 wherein the sticky contaminants comprise an adhesive.

18. The method of claim 16 wherein the sticky contaminants comprise a tackifier.

19. The method of claim 16 wherein the sticky contaminants are selected from the group consisting of polyvinyl acetate polymers, polyvinyl acetate copolymers, ethylene vinyl acetate polymers, ethylene vinyl acetate copolymers, polystyrene, styrene-butadiene polymers, polypropylene, polyethylene, polyamide, rubber compounds, wax, and mixtures thereof.

20. The method of claim 16 wherein the level of sticky contaminants in the cellulose-containing secondary fibers is reduced prior to de-inking of the fibers.

21. The method of claim 16 wherein the level of sticky contaminants in the cellulose-containing secondary fibers is reduced prior to bleaching of the fibers.

22. The method of claim 16 wherein the pressure is less than about 300 atmospheres and the temperature is less than about 200° C.

23. The method of claim 22 wherein the level of sticky contaminants in the cellulose-containing secondary fibers is reduced prior to de-inking of the fibers.

24. The method of claim 22 wherein the level of sticky contaminants in the cellulose-containing secondary fibers is reduced prior to bleaching of the fibers.

25. The method of claim 16 wherein the pressure is between about 40 atmospheres and about 200 atmospheres and wherein the temperature is between about 90° C. and about 150° C.

* * * * *